UNITED STATES PATENT OFFICE.

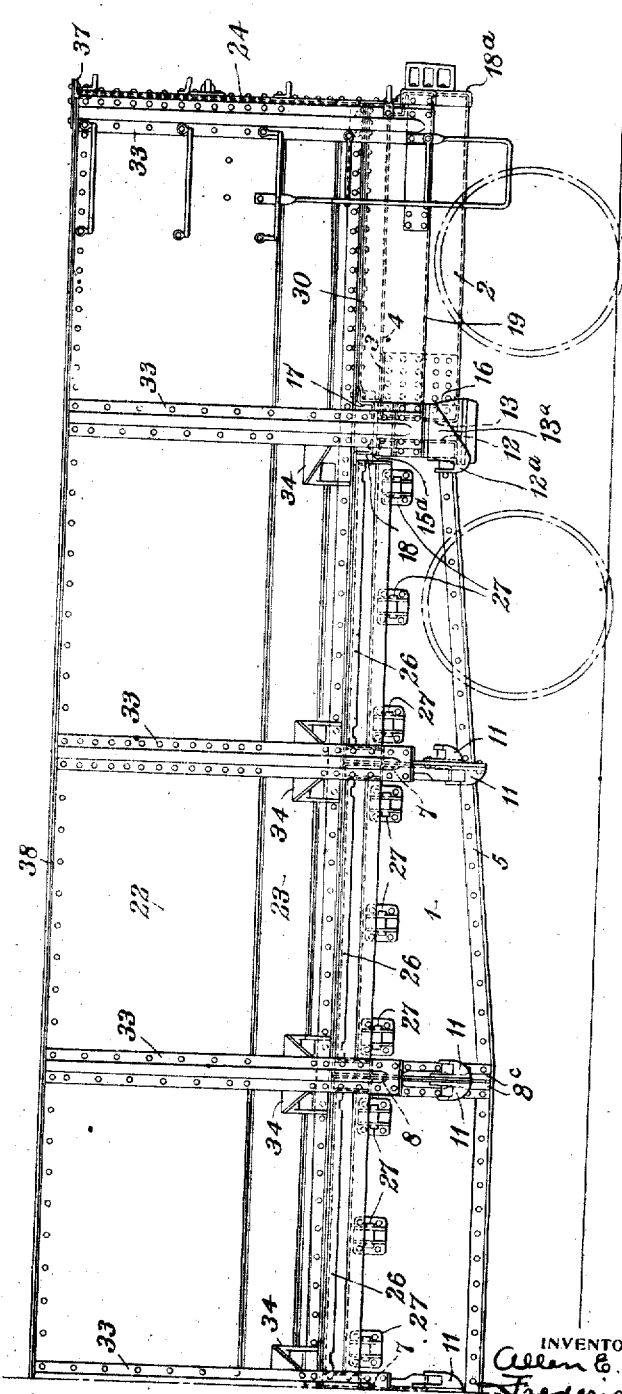

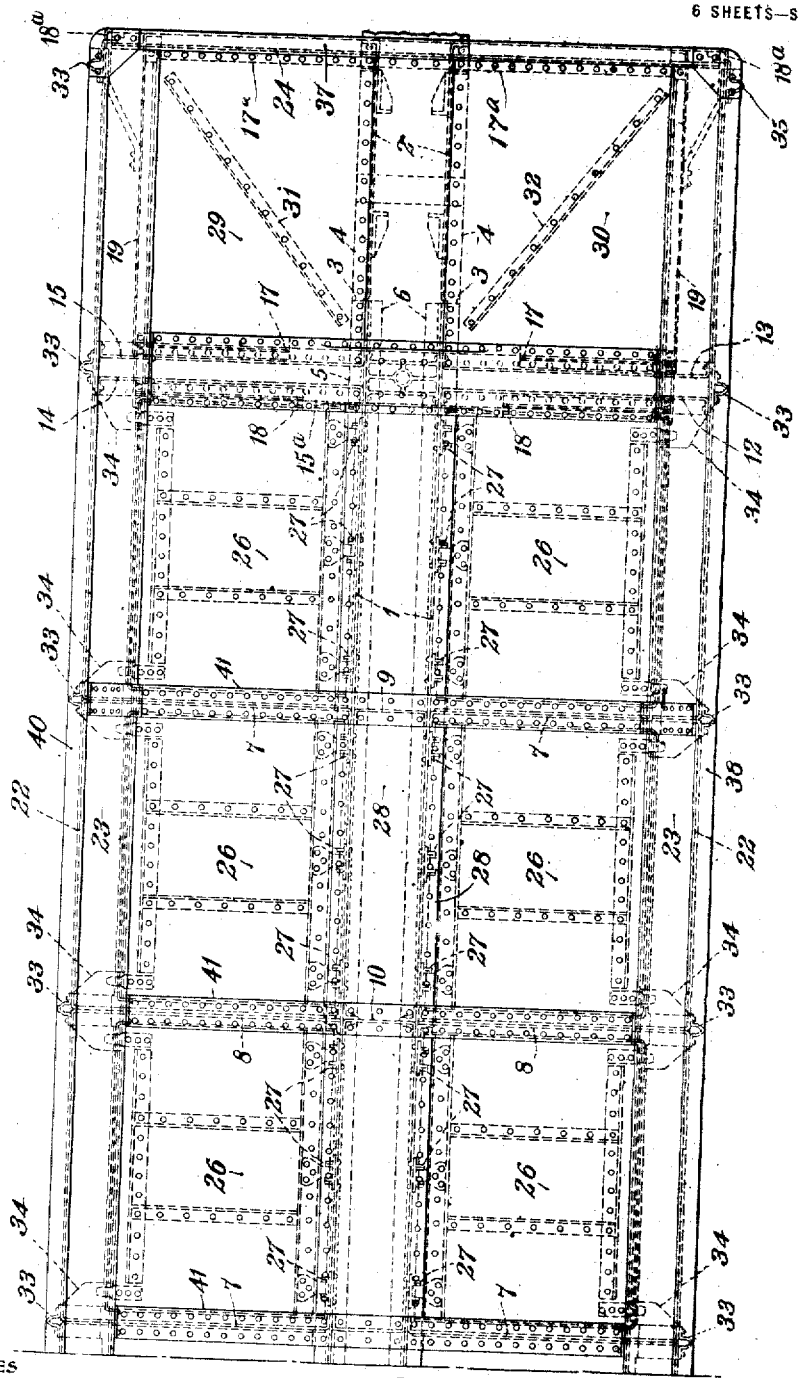

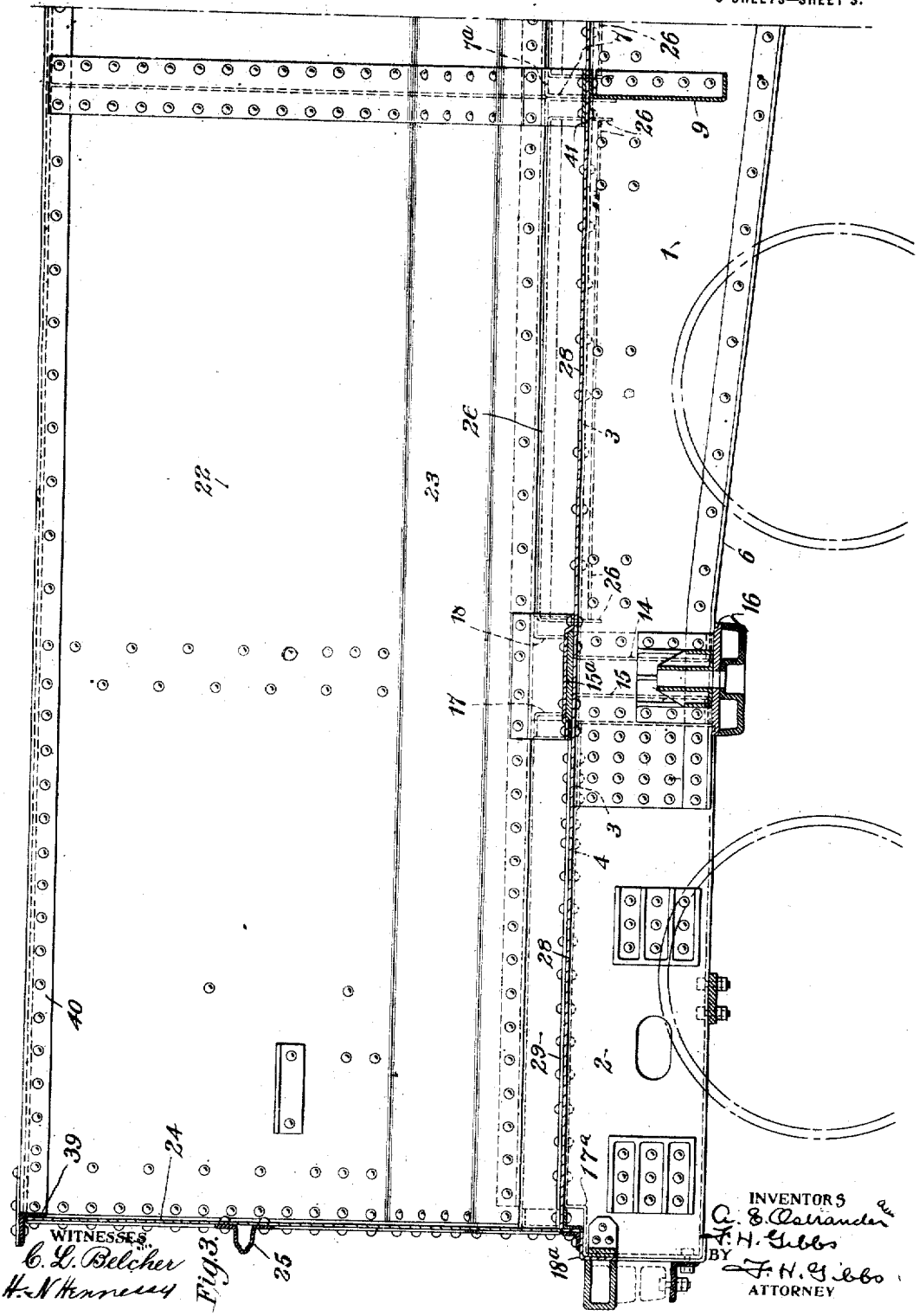

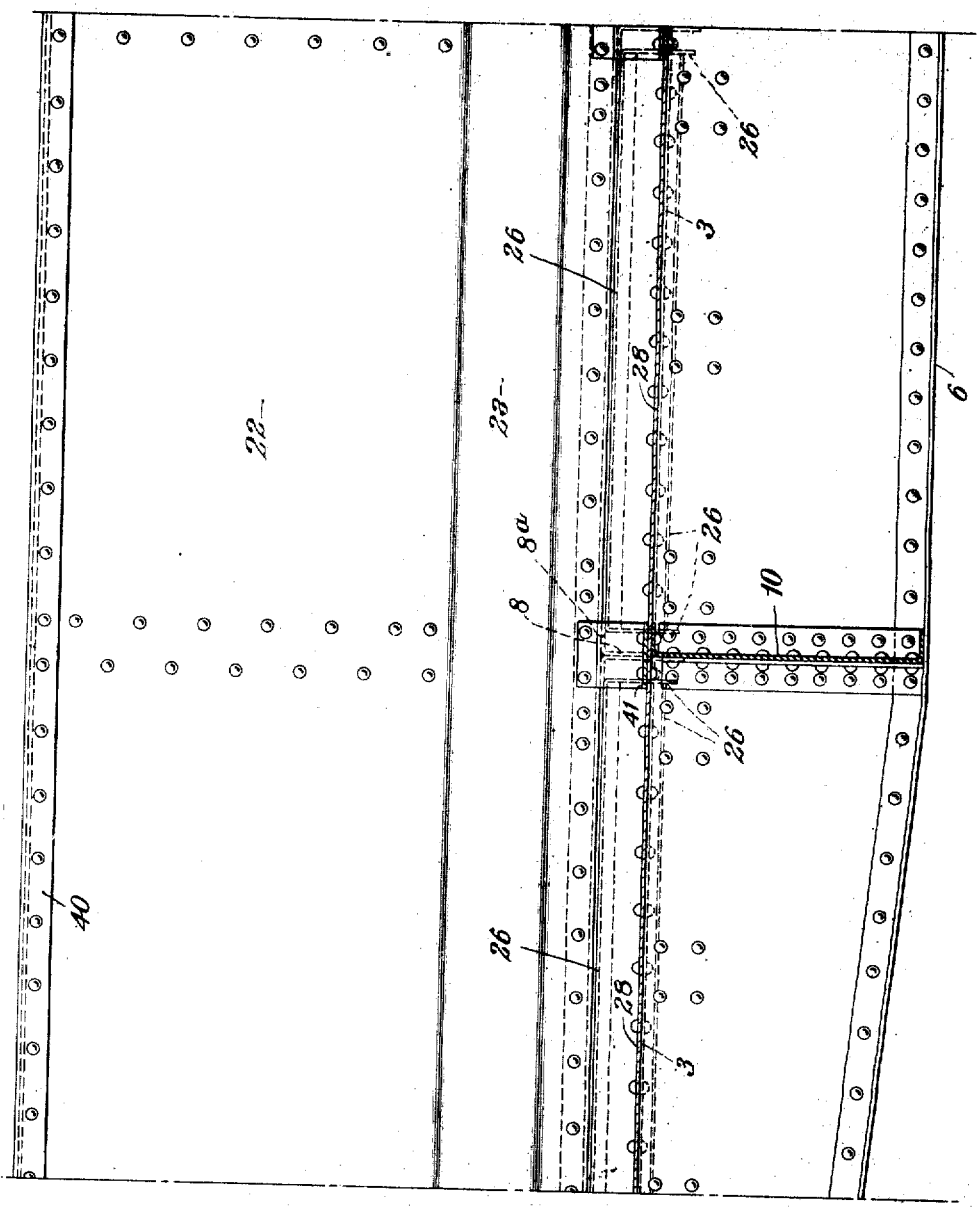

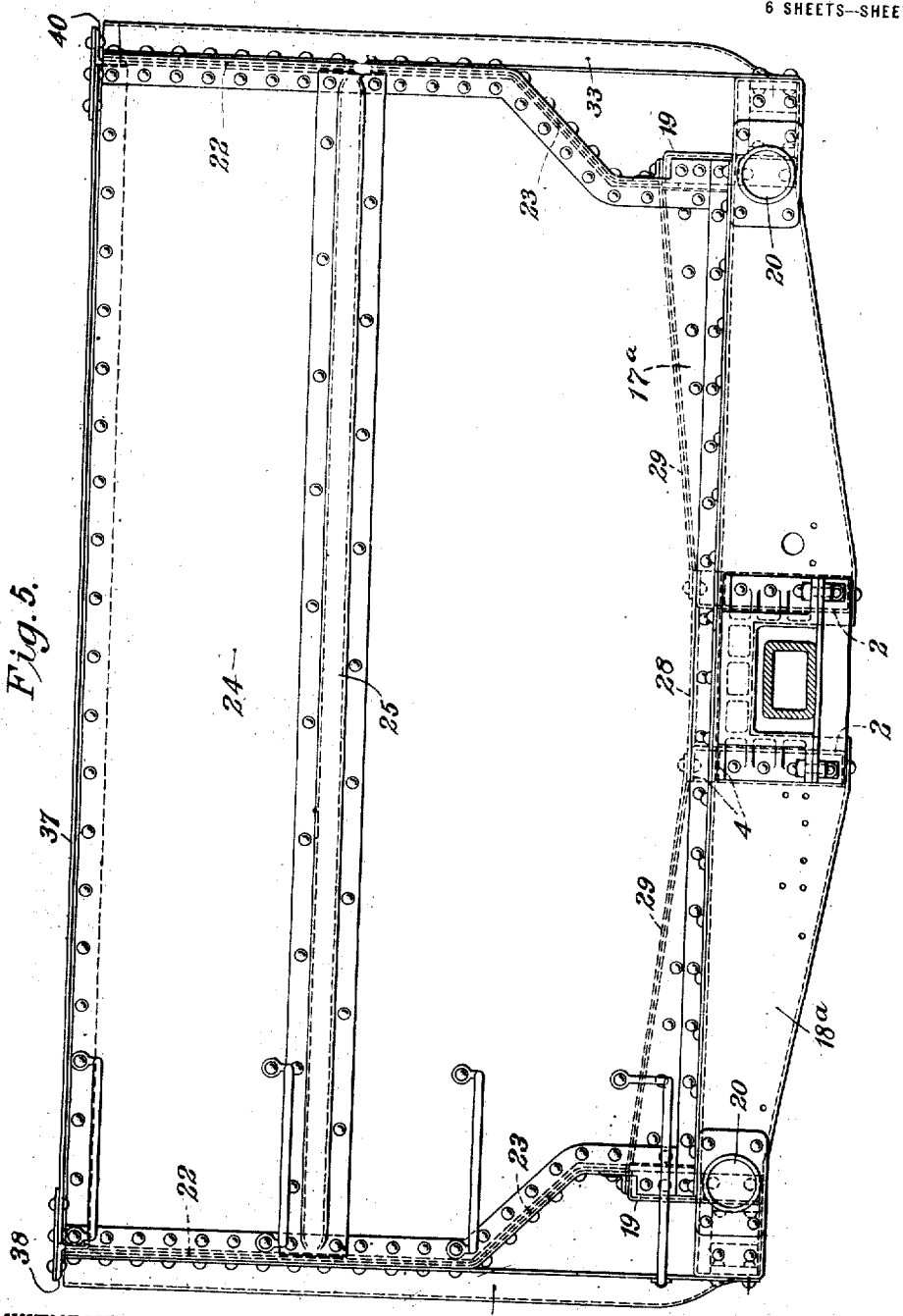

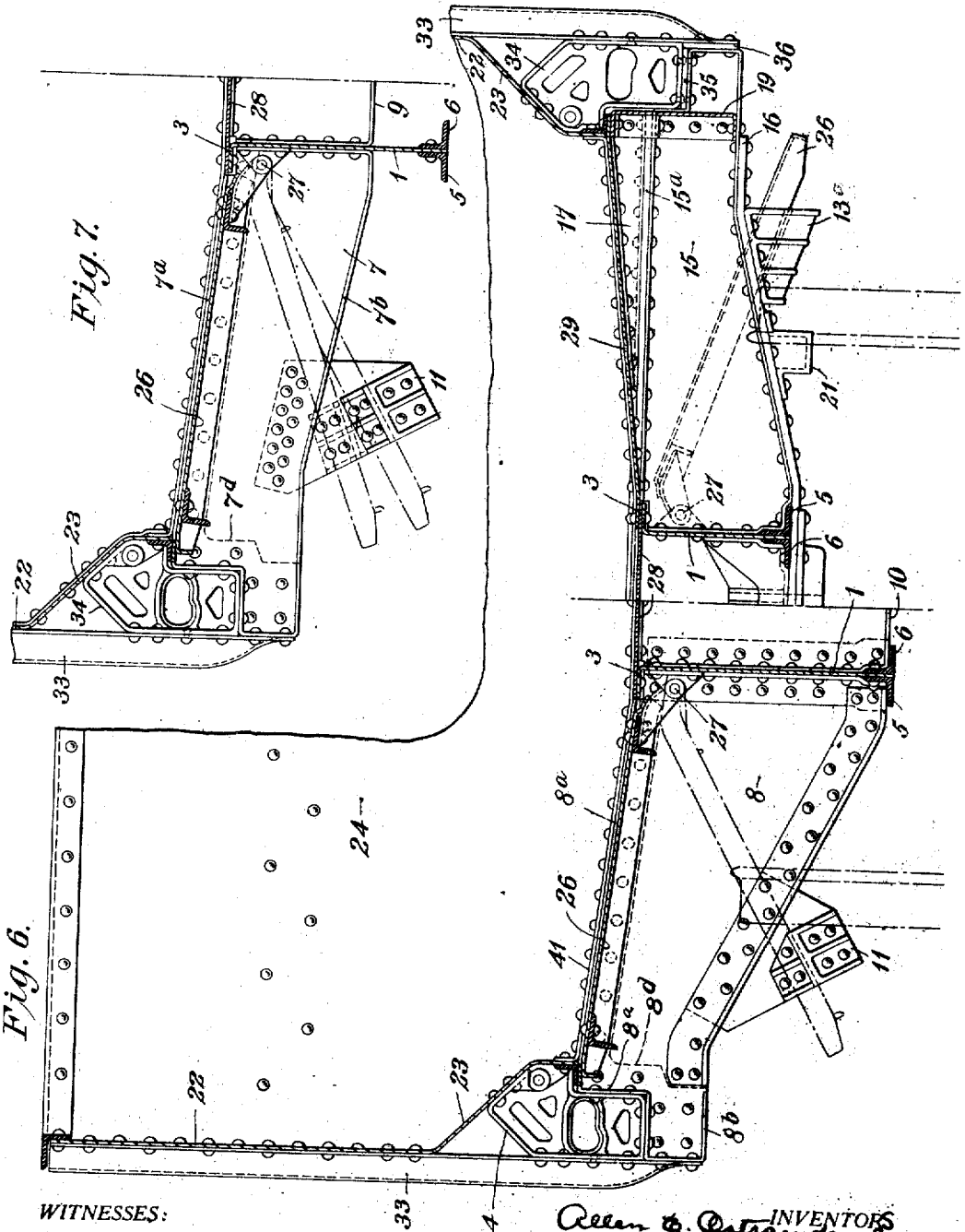

ALLEN E. OSTRANDER, OF RIDGEWOOD, NEW JERSEY, AND FREDERICK H. GIBBS, OF NEW YORK, N. Y.

DUMPING-CAR.

1,140,606.  Specification of Letters Patent.  Patented May 25, 1915.

Application filed February 4, 1913. Serial No. 746,211.

*To all whom it may concern:*

Be it known that we, ALLEN E. OSTRANDER and FREDERICK H. GIBBS, residing at Ridgewood, New Jersey, and New York city, New York, respectively, and being citizens of the United States, have invented certain new and useful Improvements in Dumping-Cars, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 represents a side elevation of half a car embodying this invention. Fig. 2 is a plan view of the same. Figs. 3 and 4 represent an enlarged longitudinal central section of the other half of the car. Fig. 5 represents the car end. Fig. 6 represents in the right hand half a section of the car at the bolster, and in the left hand half a section of the car at the deep cross bearer. Fig. 7 represents a section of the car at the narrow cross bearer.

This invention relates to car construction and particularly to dump cars of that type wherein the doors forming the bottom thereof are pivotally supported by the center sill construction and extend to the outer sides of the car and are there connected with means adapted to control and operate the same, and comprehends in its adaptation certain novel details in underframes and car-body constructions whereby the discharge of the lading shall occur between the center sills and side walls in such manner that the gravity of the lading thereof shall tend to choke or retard the flow thereof and create a discharge at practically uniform speed at the door ends. And, after the bulk of the lading has been discharged, provision is made for causing the residuum to gravitate to the central longitudinal plane of the car, whereby said car may be expeditiously cleared.

It also comprehends the incavating or hollowing out of the car bottom to lower the center of gravity of the loaded car and the utilization of the lading mass at the end of the car to assist in resisting the buffing stresses. The form given the bottom wall of the car body in incavating it, and that given to the cross bearers, serves to relieve the stress on the outer ends of the cross-bearers and of the doors, by directing the load to an extent to the center sill construction.

It also comprehends the utilization of the webs of the cross members to produce with the doors maximum discharge chutes that shall discharge the lading beyond the tread of the car and it also comprehends a novel form of bracing the end sills and bolsters intermediate their lateral extent.

Referring to the drawings, the underframe comprises a center sill construction of trussed form wherein the webs 1 are tapered upward penetrating the bolsters and are secured within the draft sills and bolsters and with the draft sills 2 form a continuous spaced center sill construction from end to end of the car. The upper part of the center sill is provided with an outturned flange 3 which is longitudinally coincident with the upper flange 4 of the draft sills and which forms the compression flange of the center sill truss. The lower portion of the center sill web is provided with a pair of angle irons 5 and 6 placed back to back and fixed to the said center sill web forming the tension flange of the center sill truss.

The cross bearers are of two types, narrow 7 and deep 8, and for convenience in the understanding of the construction, the narrow cross bearers are called floor beams 7, but this terminology is not intended as a limitation as each cross-bearer is formed for the same purpose and adapted in their construction to bear their load in proportion to their locality in the underframe. The floor beams and cross bearers are in form of diaphragms having outlining flanges, the upper being designated 7$^a$ and the lower 7$^b$ for the floor beams and 8$^a$ and 8$^b$ for the deep cross bearers. The diaphragms of the deep cross-bearers 8 are deeper at their inner ends, which are adjacent the center sill construction, than they are at their outer ends, and their upper and lower edges are upwardly and outwardly inclined, in such manner that the upper diaphragm edge inclines upwardly from the center sill construction until its highest point is in a plane considerably above the uppermost plane of said center sill construction. Diaphragm 8 of the deep cross-bearer is angularly recessed or notched at its upper outer end, and an outlining flange parallels the upper edge, as at 8ª, the contour of the notch, the vertical end edge and a small portion of the bottom edge of said diaphragm, the latter showing at 8ᵇ. The remainder of the lower diaphragm edge is outlined and stiffened by a pair of angles 8ᶜ, on opposite sides thereof, see Figs. 1 and 6, or, preferably, by what is known in the steel trade as "dropper bars", each of which is an angular piece one of whose legs is relatively narrow. The diaphragm at its upper edge, on the side opposite that having said flange 8ª, is reinforced by a stiffener 8ᵈ, preferably an angular pressing the outstanding flange of which follows a path parallel to that of said before mentioned diaphragm flange 8ª. The vertical leg of this pressing is attached to said diaphragm and has a uniform width which parallels the outstanding leg or flange except under the cross-bearer notch where it is widened to an area corresponding to that in the diaphragm below said notch. The notch in the end of the cross-bearer is provided for the reception of a door operating mechanism supporting bracket, to which it gives a directly re-acting support, and which will be described hereinafter. The diaphragm of the floor beam 7 is provided with an integral outlining flange similar to the outlining flange 8ᵉ of the deep cross-bearer, except that it substantially surrounds the diaphragm 7. A stiffener 7ᵈ, similar to stiffener 8ᵈ of the cross-bearer 8 is applied in a like manner to floor beam 7, which has the same kind of notch as said cross-bearer. The diaphragm 7 and its upper and lower flanges are inclined upward from the center sill construction, the upper flange 7ª and the outstanding flange of stiffener 7ᵈ conforming to the plane of the flange 8ª of the deep cross bearer but the upper and lower flanges of this cross bearer or floor beam 7 are practically parallel. The deep cross bearers and the floor beams are fixed to the center sill construction and diaphragms 9 and 10 are fixed within the center sill construction, the former in alinement with floor beams 7 and the latter with cross beams 8, whereby each will form a complete metallic bridge from side to side of the car. The floor beams 7 and the deep cross bearers 8 are provided with door stop castings 11 fixed to plates rigidly secured to the webs thereof, the inner projecting edge of the said casting lying in approximately the vertical plane of the center of the wheel tread.

The bolsters employed in this construction are of the diaphragm type provided with outlining flanges, four diaphragms being used in each bolster, as 12, 13, 14 and 15, each pair of diaphragms being spaced apart and arranged back to back. The diaphragms are arranged deeper at the inner ends than at the outer ends but the upper flanges are designed to lie in practically the same horizontal plane. The deeper side of the bolster diaphragm is designed to be fixed to the center sill construction. Upper tie plates 15ª unite the upper flanges of the said diaphragms and lower tie plates 16. The lower flanges and the center sills are spaced apart and braced by the king pin casting. The upper outer edges of the bolster diaphragms are recessed or notched in practical alinement with the notches of the cross members. Each companion pair of bolster diaphragms, 12—13 and 14—15, respectively, is provided with a door stop casting 13ª, in general, similar to the door stop castings 11, with the exception of its means for and mode of attachment. Castings 13ª each have a rib-strengthened horizontal attachment flange inclined inwardly and downwardly in accordance with the inclination of the lower flanges of the pair of bolster diaphragms it is associated with, and which it spans and connects. All of stop castings, 11 and 13ª, have upstanding flanges designed to be engaged by said flanges on the doors 26, when the latter are in their lowermost position. Said doors are thus held against undue lateral vibration during the load-discharging period, and their hinges projected from loosening influences due to such vibration. Above the bolster and secured to the upper tie plate and the upper flanges of the bolster sections are Z-shaped pieces 17 and 18 in form of flanged wedges which are arranged in such manner that the bottom flanges of the Z-shaped pieces abut and the top flanges wing outwardly to afford a maximum supporting surface for the car bottom. The function of these particular Z pieces will be explained hereafter. The bolsters are provided with a convenient form of side body bearing as 21.

The end sills are in form of dished diaphragms 18ª having their flanges turned inwardly, and are braced intermediate their outer ends by means of pressings 19 in channel form but having their inner and outer ends flanged to fit within the flanges of the end sills and into the built-up bolsters and Z pieces 17. The push pole pockets 20 are fixed to the face of the end sills directly in advance of the juncture of the pressing 19 with the said end sills.

The superstructure or body of the car comprises side plate girders 22 having a tumbled in inclined lower shedding portion 23, the upper portion of the girder being in the plane of the outer edge of the floor beam 7 and cross bearers 8 and the shedding portion being the width of the inside of the notch or recess in the transverse members. The car end walls 24 are of the usual plate girder type and are indented or notched at their lower portion to fit the conformation of the side wall plate girder. These car ends are provided with a flanged corrugated stiffener 25, the corrugations thereof tapering to zero at the car edges and are also provided with hand grips or ladder irons.

The car bottom is incavated or hollowed out relative to the horizontal and is composed mainly of doors 26 which are hinged to the center sill construction, preferably to the webs of the spaced center sills, and the hinge 27 is arranged at some distance below the top of the center sill so that the doors in closing acquire a concentric reciprocal or jaw-like motion and therefore eliminate or crush any substance between the doors and the center sills and render an ice-seal impossible. Furthermore, the incavated contour of the car bottom, when the doors are in closed position, is so arranged that the center of gravity of the door shall lie above the horizontal plane of the top chord or compression member of the center sills and the doors in opening have to drop from a position above the horizontal through the horizontal and consequently taken in connection with the lowering of the hinges 27 produce a maximum outlet for the lading and greatly facilitate the opening of the doors. It will be observed here that the center sill construction or the cover plate 28 thereof forms a part of the carbody and that the incavated contour of the bottom especially considering the shedding portions 23 of the side walls tend to place the weight strain upon the door hinges rather than upon the door operating and locking means.

From an inspection of Figs. 1, 3, and 4, it will be observed that the car end from the bolster to the car end wall 24 is not provided with discharge openings, the reason therefor being that the weight of the lading in that portion of the car will act as a lading buffer against the end stresses when submitted to such and only the top-most portion of the lading will be dislodged which would not be the case were the car end provided with discharge openings. The reason discharge openings have not been located in these ends is that a buffing stress would tend to crumple the necessarily light construction at this place and would also tend to burst open the discharge openings. To prevent any contingencies of this kind plates 29 and 30 take the place of the doors and these plates are diagonally braced by angle irons 31 and 32 and by the brace 19 extending from the bolster to the end sills. It will now be observed that the bottom end plates 29 and 30 may need adjustment to make them conform to the incavated contour of the body which is the use and function of the Z-bar wedges 17 and 18 heretofore referred to that can be arranged at will for this purpose. Secured to the bottoms of end plates 24 are angular wedges 17ª cooperating with and serving the same purpose as Z-bar wedges 17 and 18. See Figs. 2, 3 and 5. As this car has no side sills, side stakes 33 are employed and a form is shown wherein a flanged corrugated pressing, the corrugations thereof tapering to zero at the bottom, is employed. These said stakes are secured to the transverse members and to the side plate girders and the space thus left by the recessed notched portion of the transverse members and the tumbled in shedding portion of the plate girders is filled by a casting 34 which is outlined by flanges of varying widths to conform to the side stakes, the transverse members and to a part of the outer surface of the tumbled in shedding portion 23 and the web of this casting is adapted to carry the car door operating shaft and its control. It will be observed that the recessed or notched portion of the bolster shows filler plates 35 and 36 in Fig 6; these filler plates are merely shown as convenient means for adjusting the alinement of the parts at the bolster relative to the other cross bearers. The top of the car is preferably provided with outlining flanges 37, 38, 39 and 40 as a finish and at the same time as a stiffener and the car body between the doors is provided with narrow transverse strips 41 for the purpose of increasing the width of the flanges against which the doors abut in their closed position. The advantage of this incavated form of construction is that the lading is practically forced to the center of the car thereby removing considerable strain from the door fastening and operating mechanism and also by the downwardly inclined convergence of the shedding portion of the side walls and the doors when opened, the discharge will choke itself and flow out more evenly. The downward and inward inclination of the transverse members to permit their upper edges to meet the top of the center sills has an advantage of allowing the doors and said transverse members to form tight discharge chutes of maximum capacity which will extend beyond the tread of the trucks of the car.

From an inspection of Figs. 1, 2, 5 and 6, it will be noted that the braces 19 extend from the end sills just back of the pushpole pockets 20 to opposite outer end portions of the bolster just within the recess near the end of said bolster. and the braces are positioned intermediate the ends of the end sill of the bolster, as well as outwardly beyond the lower vertical portion of the side wall. The braces extend parallel with but below said side wall from end sill to bolster and thereby reinforce the side wall longitudinally of the car while the car is being moved by means of a pole resting in the push-pole pocket, thereby relieving the side wall of the stress incident to said polling.

What I claim is:—

1. A car construction comprising a center sill construction, side and end walls, transverse members inclined upwardly from said center sill and attached to said side walls, and a bottom wall composed of a series of doors operating in either direction through and beyond a horizontal plane.

2. A car construction comprising a center sill construction and transverse members, side and end walls, a bottom wall composed of a series of doors operating in either direction through and beyond a horizontal plane and stops fixed to the transverse members adapted to limit the opening throw of the doors.

3. A car construction comprising a series of drop doors hinged below the compression element of the center sill construction and having their centers of gravity above the extended plane of said compression element.

4. A car construction comprising a center sill, upright side walls having inwardly and downwardly extending lower portions, a bottom wall extending from the bottom of each side wall downwardly to and being connected with said center sill.

5. A car construction comprising side walls each occupying a pair of vertical planes and an intermediate inclined plane, end walls, a center sill construction parallel to said side walls and midway therebetween and an incavated bottom wall horizontal at said center sill construction.

6. A car body comprising side walls, each occupying a pair of vertical planes and an intermediate inclined plane, an incavated bottom wall having oppositely inclined portions connected by a central horizontal portion, and end walls.

7. A car body comprising side walls, each having a lower inclined shedding surface directed toward a center sill construction, parallel spaced apart load-carrying inclined transverse members supported thereby and serving also as chute walls, and drop doors downwardly inclined in closed position toward and to said center sill construction to coöperate with said transverse members in concentrating the load thereat and having in another position an opposite downward inclination and acting as bottoms for said chutes, and in the latter position, forming together with said inclined portions of said side walls, converging surfaces adapted to retard and direct the discharge of the lading.

8. A car body comprising side walls having downwardly and inwardly inclined shedding portions, the transverse members having vertical webs supporting the same intermediate the ends of said members and in a plane above a center sill construction, drop doors hinged to the latter, and means rigidly fixed to and depending from said transverse members for limiting the drop of the doors, said doors forming with the webs of said transverse members discharge chutes extending beyond the tread of the car truck.

9. A car body having a bottom wall of substantially uniform cross-section throughout its length and comprising permanently fixed incavated end portions, a series of downwardly and inwardly inclined doors, and a center sill construction having a top horizontal plate forming the transverse central portion of said bottom wall, transverse members and converging side walls forming with said doors a converging discharge opening for ladings.

10. A car construction comprising a center sill construction, transverse members extending the full width of the car and notched at their upper outer edges to provide a directly re-acting support for door operating mechanism.

11. A car construction comprising a center sill construction and transverse members including bolsters, a car body provided with downwardly and inwardly inclined drop doors between the transverse members intermediate the bolsters, and end body portions beyond said bolsters adapted to hold sufficient lading to form a lading buffer against a buffing stress, the bottom wall of each body portion having opposite inclinations t direct a discharging lading toward the central longitudinal plane of the car.

12. A car construction comprising a center sill construction and transverse members, a carbody having an incavated bottom consisting in the main of a series of dump doors, side stakes supporting a portion of said car side and an operating shaft casting supporting another portion of said car sides.

13. In a car construction, a center sill construction having a top cover plate, transverse members, downwardly and inwardly inclined wedges secured thereupon, end walls, wedges of the same inclination as said first mentioned wedges secured thereto, side walls, an inclined bottom sheet resting upon all of said wedges and secured thereto and to said center sill construction and side walls.

14. In a car construction, a center sill construction having a top cover plate, bolsters and end sills, the former having spaced apart parallel members with their top surfaces in a horizontal plane, a car body having end and side walls, braces connecting said bolsters and end walls, wedges supported upon said bolsters members, wedges secured to said end walls, and inclined bottom sheets resting upon and secured to all of said wedges.

15. In a car construction, a center sill construction, cross-bearers having webs extending outwardly therefrom and partly thereabove, each cross-bearer comprising an angled notch in the outer end thereof, an integral outlining flange following the contour of said notch, and an angular shaped stiffener in proximity to said notch.

16. In a car construction, a center sill construction, bolsters and end sills, wedges mounted upon said bolsters, floor sheets resting on said wedges, braces extending parallel to said center sill and connecting said end sills and bolsters intermediate their longitudinal extent.

17. A car body comprising side and end walls and an incavated bottom wall including a relatively flat center sill cover-plate and doors inclined upwardly from said cover plate.

18. In a dumping car, a relatively flat horizontal center sill plate, dumping doors inclined upwardly and outwardly therefrom and upwardly inclined transverse underframe members.

19. In a dumping car, an incavated bottom portion at each end including inclined floor sheets and a horizontal center sill cover-plate.

20. In a dumping car-body, a center sill cover-plate horizontally disposed extending from end to end thereof and outwardly and upwardly inclined floor sheets terminating intermediate the side edges of said cover-plate.

21. In a dumping car, an underframe comprising transverse members having upwardly and outwardly inclined upper faces, a relatively horizontal center sill plate, and fixed and movable floor plates hinged in proximity to said center sill plate, said floor plates inclining upwardly and outwardly.

22. A car construction comprising a center sill construction, bolsters, inclined transverse members, side walls supported in a plane higher than said center sill, end walls and a bottom wall comprising a series of inclined doors extending from said center sill to said side walls and operable in either direction through and beyond a horizontal plane.

In witness whereof we have hereunto set our hands in the presence of two witnesses.

ALLEN E. OSTRANDER.
FREDERICK H. GIBBS.

Witnesses:
ALFRED WAGSTAFF, Jr.,
HOWARD N. HENNESSY.

Corrections in Letters Patent No. 1,140,606.

It is hereby certified that in Letters Patent No. 1,140,606, granted May 25, 1915, upon the application of Allen E. Ostrander, of Ridgewood, New Jersey, and Frederick H. Gibbs, of New York, N. Y., for an improvement in "Dumping-Cars," errors appear in the printed specification requiring correction as follows: Page 2, line 72, strike out the period and insert a comma, and line 73, begin the article "The" with a small *t*, thus making a continuous sentence; same page, line 96, for the word "projected" read *protected;* and that the said Letters Patent should be read with these corrections therein that the same may conform to the record of the case in the Patent Office.

Signed and sealed this 27th day of June, A. D., 1916.

[SEAL.]

R. F. WHITEHEAD,
*Acting Commissioner of Patents.*